No. 689,485. Patented Dec. 24, 1901.
W. B. GOVETT.
BRAKE FOR BICYCLES OR OTHER LIKE VEHICLES.
(Application filed Dec. 20, 1900.)
(No Model.) 2 Sheets—Sheet 2.
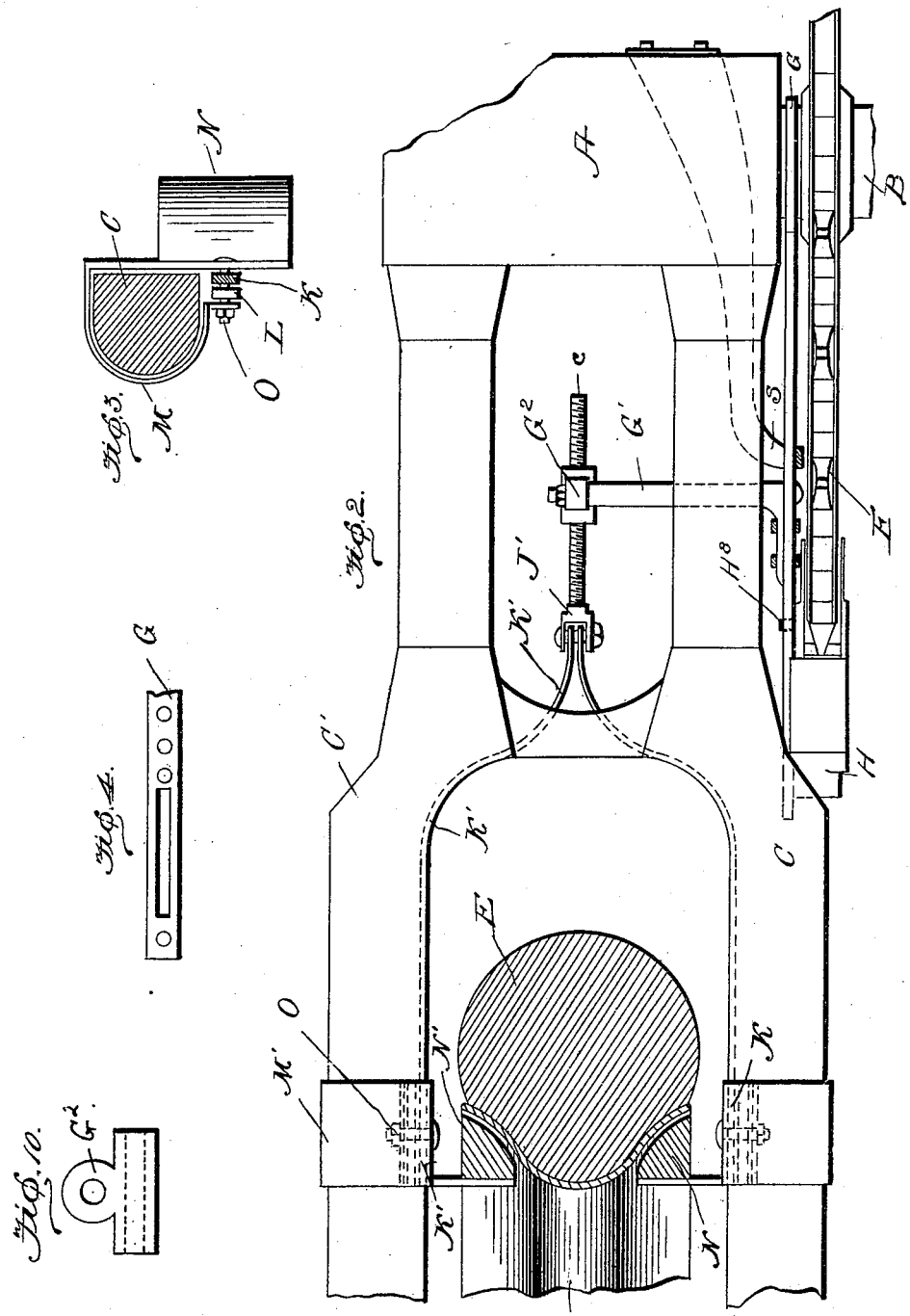

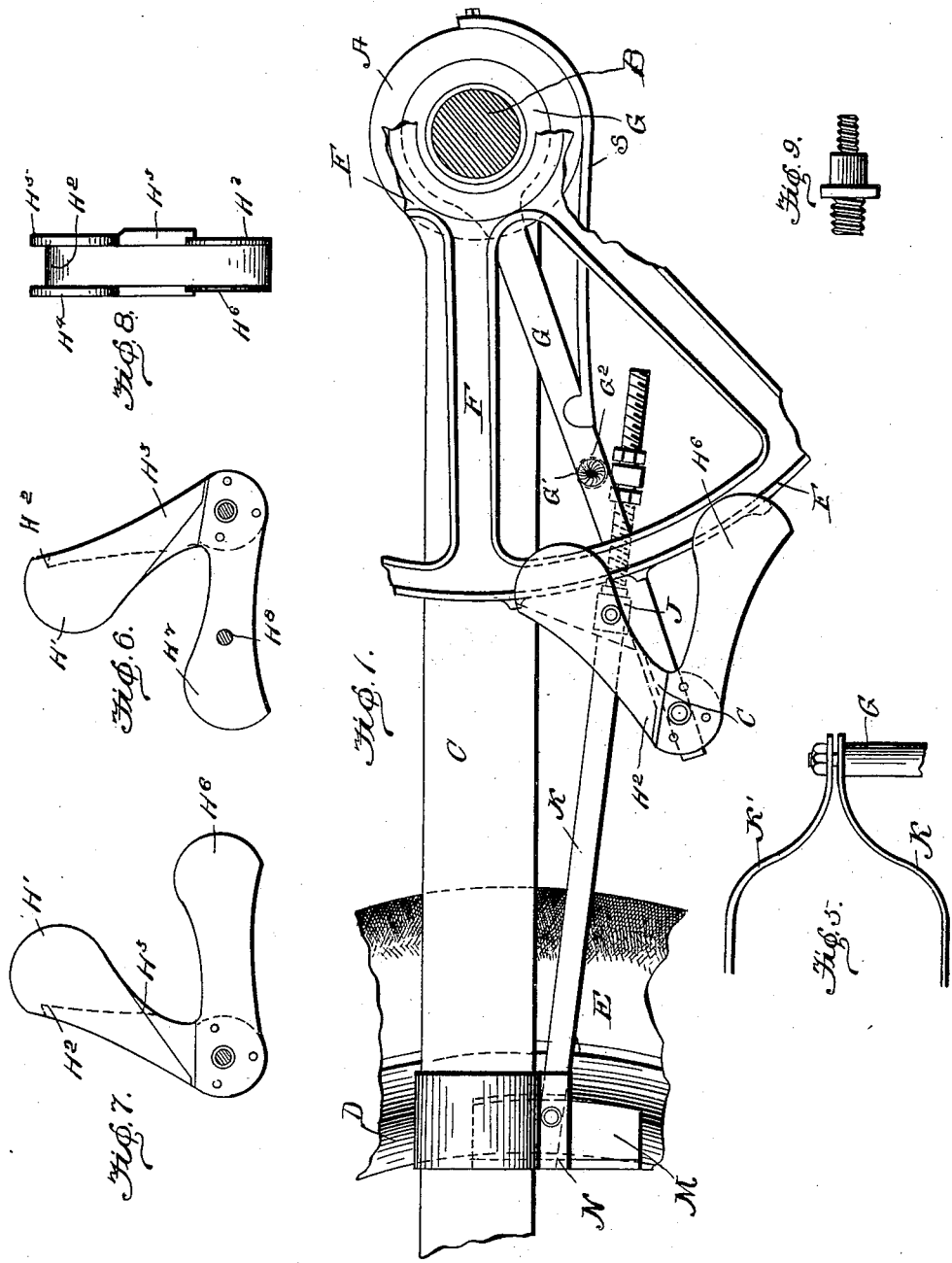

UNITED STATES PATENT OFFICE.

WILLIAM BOYES GOVETT, OF BRISBANE, QUEENSLAND.

BRAKE FOR BICYCLES OR OTHER LIKE VEHICLES.

SPECIFICATION forming part of Letters Patent No. 689,485, dated December 24, 1901.

Application filed December 20, 1900. Serial No. 40,603. (No model.)

*To all whom it may concern:*

Be it known that I, WILLIAM BOYES GOVETT, a subject of the Queen of Great Britain and Ireland, and a resident of 134 Albert street, Brisbane, in the Colony of Queensland, have invented certain new and useful Improvements in Brakes for Bicycles or other Like Vehicles, of which the following is a specification.

My invention relates to improvements in brakes designed more especially for use with free-wheel bicycles; and it consists in a lever-arm fitting on the driving-axle or the bottom-bracket shell, according to the make of the machine, between the bottom bracket and the driving sprocket-wheel. To this arm is pivoted a bell-crank which engages with the teeth of the sprocket-wheel, and at about the center of the length of this arm is secured thereto a pin, to which is attached by a link, if necessary, an adjusting-screw, on one end of which is a jaw, to which are secured by bolt and nut two rods with forked ends. Connected to the forked ends are clips which fit around and slide along the chain-stays. The adjusting-screw and connecting-link may be dispensed with by lengthening the ends of the forked rods and connecting same direct onto the pin above referred to by bolt and nut. (See Figure 5.) Onto the sliding clips are secured leather or other brake-blocks which engage with the rim of the back wheel. The lever-arm is supported by a pressure or spiral spring secured to the frame of the machine.

To fully describe my invention, I will now refer to the drawings, in which—

Fig. 1 is a side elevation of brake fitted to bicycle with brake applied; Fig. 2, a plan of same; Fig. 3, a section of chain-stay, showing clip and brake-block; Fig. 4, an end of lever-arm; Fig. 5, a plan of forked rods connected to pin of lever-arm where the adjusting-screw is dispensed with; Fig. 6, a view of one side of bell-crank; Fig. 7, r view of reverse side of bell-crank; Fig. 8, a front view of bell-crank; Fig. 9, an elevation of bell-crank pivot-pin. Fig. 10 is a detail view of the link G².

The reference-letters indicate like parts in all figures.

A is the bottom-bracket shell; B, the driving-axle; C and C', the chain-stays; D, the back-wheel rim; E, the tire, and F the sprocket-wheel.

Fitting onto the axle B or onto the bottom-bracket shell, between the bottom bracket and driving sprocket-wheel, is a lever-arm G, to the end of which is pivoted a bell-crank H, the lower arm of which is in two parts and which grips the rim of the sprocket-wheel on either side. The upper arm or pawl engages with the teeth of the sprocket-wheel when applying the brake. About the center of the lever-arm G is secured a pin G', upon which is pivoted a link G², having its lower half at right angles to the upper half. The lower half is to receive an adjusting-screw J for the purpose of taking up when necessary the wear of brake-blocks or chain. One end of the adjusting-screw is provided with jaws J'. Connected to same by bolt and nut are forked rods or straps K and K'. Onto the forked ends of these rods are clips M and M', of spring-steel, preferably lined with leather, which are sprung onto the chain-stays, upon which they slide along. Secured to these clips are leather or other brake-blocks N and N', which are molded to correspond with the section of the wheel-rim.

S is a pressure-spring secured to the frame of the machine, supporting the lever-arm G and preventing any shaking or movement of the whole of the brake mechanism when the brake is not in use. A spiral tension-spring may be substituted fastened to the frame of the machine in any convenient position. The lever-arm G may be slotted out or provided with a series of holes at the end (see Fig. 4) for adjusting the position of the bell-crank when replacing the sprocket-wheel by one of a different size.

Fig. 3 shows a detail of the clips M and M', in which M is the clip; C, the chain-stay; K, end of forked rod; L, packing, and O bolt and nut securing same together.

Figs. 6, 7, and 8 show detail of bell-crank. The top arm or pawl is made of solid metal slotted out to form a chisel-point for engaging with the teeth of the sprocket-wheel. The sides form cheeks between which the sprocket-wheel rotates. A shoulder is formed on one side to contact with the lever-arm G, as shown in Fig. 1, to relieve the pressure on the pivot-pin. The bottom arm consists of two pieces of spring-steel riveted to the top arm, one on each side. These springs grip the rim of the sprocket-wheel with sufficient pressure to throw the top arm or pawl in or out of action.

In Figs. 6, 7, and 8, H' is the top arm or pawl, slotted out, as shown in front view, Fig. 8, forming a chisel-point H². H³ is the shoulder, which rests upon the lever-arm G when pawl engages with tooth of sprocket-wheel. H⁴ and H⁵ are the cheeks between which the sprocket-wheel rotates. H⁶ and H⁷ are two pieces of spring-steel forming the bottom arm of the bell-crank which grips the rim of the sprocket-wheel, and H⁸ a stud or stop controlling the movement of the bell-crank by contact with the lever-arm G. The bell-crank is secured to the lever-arm with pivot-pin and nuts. A collar is formed on the pin. (See Fig. 9.)

In applying my invention immediately the driving sprocket-wheel is arrested by back-pedaling the top arm or pawl of the bell-crank is thrust against the periphery of the sprocket-wheel F, the chisel-point contacts with one of the teeth and prevents the wheel rotating, and the shoulder H³ of the bell-crank presses on the lever-arm G, which on being depressed draws forward the forked rods K and K', which in turn cause the brake-blocks secured thereto to impinge with the rim of the back wheel, which effectually and instantly brakes the machine, and, if necessary, the same can be brought to a dead-stop, according to the pressure employed in back-pedaling. The brake remains firmly locked by the pawl of the bell-crank in contact with one of the teeth of the sprocket-wheel, and not until the forward motion is applied to the pedal-cranks can the brake be relieved, but on instantly doing so the pawl of the crank is thrown out of contact with the sprocket-tooth and the shoulder of the pawl freed from the lever-arm, which is then raised to its normal position by the pressure-spring.

Having now described my invention, what I claim as new, and desire to secure by Letters Patent, is—

1. In improvements in brakes for bicycles and other like vehicles, the bell-crank H, the top arm slotted out to a chisel-point, acting as a pawl between two cheeks and provided with a shoulder, the lower arm composed of two pieces of spring-steel and provided with a stud and a brake and connections operated by said bell-crank lever as and for the purpose set forth and as herein described.

2. In combination with a bicycle or like vehicle, of a brake, consisting of a pin, a lever-arm connected to said pin and fitting around the crank-axle, a spring connected to the crank-hanger and having its free end contacting said lever, means carried by the free end of said lever to engage the teeth of the sprocket-wheel when said wheel is propelled backward, and a brake connected with said pin, substantially as described.

3. In combination with a bicycle, of a brake consisting of a pin, a lever surrounding the crank-axle and connected to said pin intermediate of its length, means carried by the free end of said lever adapted to be operated by contact with the teeth of a sprocket-wheel when the same is back-pedaled, a spring for returning said lever, an adjustable connection connected to the inner end of the pin, rods connected to said connection, slides mounted upon the lower bars of a bicycle-frame and connected to said rods, and brake-shoes carried by said slides to engage the rim of a bicycle-wheel.

4. In combination with a bicycle, of a brake comprising a spring-actuated lever, a bell-crank lever carried upon the free end thereof to engage the teeth of a sprocket-wheel when the same is back-pedaled, and means connected to said lever to retard the motion of a wheel of the bicycle when the bell-crank lever engages the teeth of the sprocket-wheel.

In witness whereof I have hereunto set my hand in presence of two witnesses.

WILLIAM BOYES GOVETT.

Witnesses:
E. GASTON ABEEL,
C. S. ABEEL.